(12) United States Patent
Tsutsumi et al.

(10) Patent No.: US 7,684,670 B2
(45) Date of Patent: Mar. 23, 2010

(54) WIRE ACCOMMODATION APPARATUS

(75) Inventors: Kenji Tsutsumi, Kawasaki (JP); Manabu Wakao, Kawasaki (JP); Kouichi Kuramitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/389,457

(22) Filed: Feb. 20, 2009

(65) Prior Publication Data

US 2009/0220205 A1 Sep. 3, 2009

(30) Foreign Application Priority Data

Feb. 22, 2008 (JP) ............................. 2008-041152

(51) Int. Cl.
*G02B 6/00* (2006.01)
*G02B 6/38* (2006.01)
*G02B 6/36* (2006.01)
*H01R 39/00* (2006.01)
*H01R 4/38* (2006.01)

(52) U.S. Cl. ..................... 385/137; 385/66; 385/75; 385/76; 385/134; 385/135; 385/136; 385/138; 439/11; 439/13; 439/15; 439/18; 439/19; 439/20; 439/31; 439/253

(58) Field of Classification Search ................. 385/66, 385/75, 76, 134–138; 439/11, 13, 15, 18–20, 439/31, 253
See application file for complete search history.

(56) References Cited

U.S. PATENT DOCUMENTS 5,724,469 A * 3/1998 Orlando ...................... 385/135
6,250,816 B1 * 6/2001 Johnston et al. ............... 385/53

FOREIGN PATENT DOCUMENTS

JP 6-27331 2/1994

* cited by examiner

*Primary Examiner*—Brian M. Healy
*Assistant Examiner*—Hung Lam
(74) *Attorney, Agent, or Firm*—Katten Muchin Rosenman LLP

(57) ABSTRACT

A wire accommodating apparatus includes a cylindrical portion around which a wire connected to a signal transmission part is wound; a number of wire holding portions which incline externally from the bottom of the cylindrical portion and are disposed pivotably; and a fixed portion formed in the cylindrical portion so as to project downward, passing through an attachment hole of a to-be-mounted member, and fixed therein.

13 Claims, 21 Drawing Sheets

WIRE ACCOMMODATION APPARATUS

CROSS-REFERENCE TO RELATED APPLICATION

This application is based upon and claims the benefit of priority of the prior Japanese Patent Application No. 2008-041152, filed on Feb. 22, 2008, the entire contents of which are incorporated herein by reference.

1. BACKGROUND

The present invention relates to a wire accommodating apparatus, and more specifically to a wire accommodating apparatus arranged so as to compactly accommodate the excessive portions of wires, such as optical fibers and electric wires, connected to optical parts or electronic parts for transmitting a signal.

2. DESCRIPTION OF THE RELATED ART

A lot of communication optical parts and electronic parts for transmitting a signal by communication are mounted on a substrate mounted on an electronic apparatus having a communication function, such as communication equipment, and the respective communication parts (optical parts and electronic parts) are connected to each other through wires, such as optical fibers and electric wires.

Further, there is a tendency that a larger number of optical parts and electronic parts are highly densely mounted on a substrate. In contrast, wires, such as optical fibers and electric wires, for connecting respective communication parts are cut off to preset and predetermined lengths to test and adjust the respective communication parts and to correct the troubles of the parts after they are mounted.

When the respective communication parts mounted on the substrate are connected to each other by the wires so that they can make communication, since the wires are formed longer than the distances between the respective communication parts, they are partly excessively long and slack. Since the excessive portions of the wires are wound at a predetermined radius of curvature, the wires are prevented from being tangled with each other and from coming into contact with other equipment.

When the excessive portions of the wires are accommodated in a wound state, since the entire lengths of the wires are not uniform and have a large dimensional dispersion (allowance), a space for accommodating the excessive portions is required.

Existing wire accommodating apparatuses will be explained referring to FIGS. 1 to 5. FIGS. 1 and 2 are views showing a conventional example 1 of the wire accommodating apparatuses.

As shown in FIGS. 1 and 2, a wire accommodating apparatus 10A of a conventional example 1 is disposed on a printed substrate 40 on which a plurality of optical parts 20, a plurality of electronic parts 30, and the like are mounted highly densely. In FIG. 1, since a lot of not shown electronic parts are also mounted, the printed substrate 40 actually has a higher mounting density. The plurality of optical parts 20 are parts for transmitting an optical signal and disposed in respective areas on the printed substrate 40 in dispersion.

The respective optical parts 20 are connected to each other through wires composed of optical fibers 50 for transmitting the optical signal. Further, the entire lengths of the optical fibers 50 are previously set to predetermined lengths, whereas the distances between the respective optical parts 20 are not previously determined and have various lengths.

When the respective optical parts 20 are connected to each other through the optical fibers 50, the optical fibers 50 have extra lengths. Thus, the wire accommodating apparatus 10A prevents the plurality of optical fibers 50 from being tangled with each other on the printed substrate 40, and prevents the optical fibers 50 from being broken by keeping the radius of curvature of the optical fibers 50 to at least a predetermined value.

In the wire accommodating apparatus 10A, clamp members 60A are disposed on the printed substrate 40 at predetermined intervals so that the optical fibers 50 are held thereby. The clamp members 60A are inserted into attachment holes passing through the printed substrate 40 and stand thereon. The clamp members 60A are attached to hold the optical fibers 50 in at least three portions thereof, that is, in the curved inlet, outlet, and intermediate portions thereof. Further, since a lot of the optical fibers 50 are disposed on the printed substrate 40, an appropriate number of the clamp members 60A are disposed according to the number and the disposition of the optical fibers 50.

As shown in FIG. 2, each of the clamp members 60A has a locking portion 61 locked on the lower surface side of the printed substrate 40, a pair of press portions 62 for generating a press force in abutment on the printed substrate 40, and an optical fiber accommodating portion 63 formed in a square shape. The optical fiber accommodating portion 63 has a gap 64 which is formed on the upper side thereof and into which the optical fibers 50 are inserted, and inclining portions 65, 66 are disposed on both the sides of the gap 64.

The optical fiber accommodating portion 63 has an internal space 63a in which the plurality of optical fibers 50 can be accommodated. Since the upper portion of the optical fiber accommodating portion 63 is covered with the inclining portions 65, 66 disposed on both the sides of the gap 64, the optical fibers 50 accommodated in the internal space 63a would not go out therefrom easily.

Further, a clamp member arranged as shown in FIG. 3 is also available as another example of the clamp member. The clamp member 60B shown in FIG. 3 has an opening/closing portion 67 pivotably disposed thereto so that the upper portion of the optical fiber accommodating portion 63 can be opened and closed thereby. Further, a locking recess 69 is formed on a side wall of the optical fiber accommodating portion 63 as shown by a double-dashed line in FIG. 3. When the opening/closing portion 67 is pivoted and made to a horizontal state, the locking recess 69 locks a V-shaped portion 68 at the extreme end of the opening/closing portion 67. When the optical fibers 50 are inserted into an internal space 63a of the optical fiber accommodating portion 63, the opening/closing portion 67 is pivoted upward and offset to an open position, whereas when the optical fibers 50 are accommodated in the optical fiber accommodating portion 63, the opening/closing portion 67 is pivoted downward so that the V-shaped portion 68 is locked to the locking recess 69.

FIGS. 4 and 5 are views showing a conventional example 2 of the wire accommodating apparatus. As shown in FIG. 4, the wire accommodating apparatus 10B of the conventional example 2 has a base 70 formed in a rectangular shape, a cylindrical portion 80 disposed at the center on the base 70, and a plurality of optical fiber holding portions 90 disposed externally of the cylindrical portion 80 on the base 70 in dispersion.

As shown in FIG. 5, the optical fiber holding portions 90 are formed in an inverse L-shape and have stopping portions 92 formed in the upper edges thereof for stopping and holding the optical fibers 50. Further, rod-like guide portions 94 stand in the vicinities of the optical fiber holding portions 90 for guiding the curved portions of the optical fibers 50.

The excessive portions of the optical fibers 50 are accommodated in an annular accommodating area 96 formed between the cylindrical portion 80, the optical fiber holding portions 90, and the guide portions 94. Further, the optical fibers 50, which are drawn out from the accommodating area 96 in a tangential direction, come into contact with the optical fiber holding portions 90 and the guide portions 94 so that they can extend in any direction.

As a conventional example other than the wire accommodating apparatuses 10A, 10B, there is a wire accommodating apparatus disclosed in, for example, Japanese Patent Application Laid-Open No. 6-27331. This wire accommodating apparatus is arranged such that optical fibers are wound around the outer periphery of a cylindrical portion, and an optical fiber accommodation portion is formed by inserting projections, which project in a radial direction from the outer periphery of an upper plate having a diameter larger than that of the cylindrical portion, into slits of a lower plate having a diameter larger than that of the cylindrical portion.

However, in the arrangement in which the plurality of clamp members 60A are disposed on the printed substrate 40 as in the conventional example 1, the number of the optical fibers 50 which can be accommodated by the clamp members 60A is small, and operation for attaching the respective clamp members 60A is troublesome. Further, the plurality of optical fibers 50 inserted into the internal space 63a of the optical fiber accommodating portion 63 intend to expand externally by the tension thereof, there is a possibility that the optical fibers 50 go out externally from the gap 64 between the inclining portions 65, 66, and thus this arrangement lacks reliability.

Further, in the arrangement using the clamp member 60B of the conventional example 1, since operation is carried out to lock and unlock the V-shaped portion 68 of the opening/closing member 67 to and from the locking recess 69 each time the optical fibers 50 are inserted into the internal space 63a of the optical fiber accommodating portion 63, it is very troublesome and time-consuming to accommodate the plurality of the optical fibers 50. Further, since the internal space 63a of the optical fiber accommodating portion 63 is small, the direction, in which the held optical fibers 50 are accommodated, lacks flexibility.

Further, in the conventional example 2, since the size of the base 70, on which the cylindrical portion 80, the plurality of optical fiber holding portions 90, and the annular accommodating area 96 are disposed, is increased, and further, the base 70 is mounted on the printed substrate 40, other parts cannot be mounted on the attachment space of the base 70, and thus it is difficult for the conventional example 2 to cope with highly-densed mounting of parts.

Further, in the arrangement shown in Japanese Patent Application Laid-Open No. 6-27331, since operation for inserting the projections of the upper plate into the slits of the lower plate in a state that the plurality of optical fibers are wound around the cylindrical portion is carried out as many times as the number of the projections, there is a possibility that the optical fibers go out by the tension thereof during the locking operation.

SUMMARY

An object of the present invention, which was made in view of the above points, is to provide a highly reliable wire accommodating apparatus by which a wire holding operation can be carried out efficiently.

A wire accommodating apparatus comprises a cylindrical portion around which a wire connected to a signal transmission part is wound; a plurality of wire holding portions which incline externally from the bottom of the cylindrical portion as well as are disposed pivotably; and a fixed portion formed in the cylindrical portion so as to project downward, passing through an attachment hole of a to-be-mounted member, and fixed therein.

DETAILED DESCRIPTION OF THE EMBODIMENTS

An embodiment of the present invention will be explained below.

Figure 1:
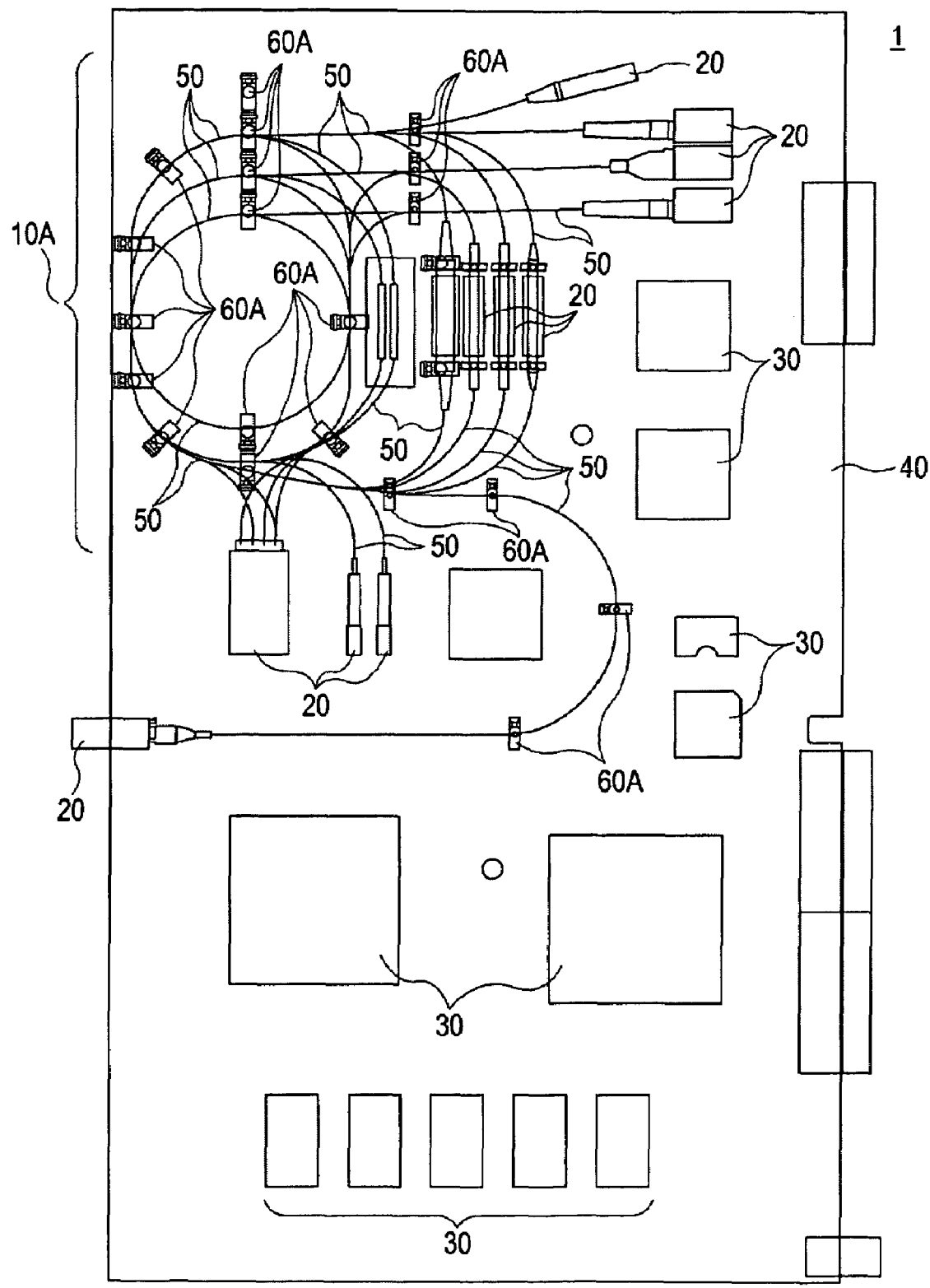
FIG. 1 is a plan view of a printed substrate on which a conventional example 1 of a wire accommodating apparatus is mounted.
Figure 2:
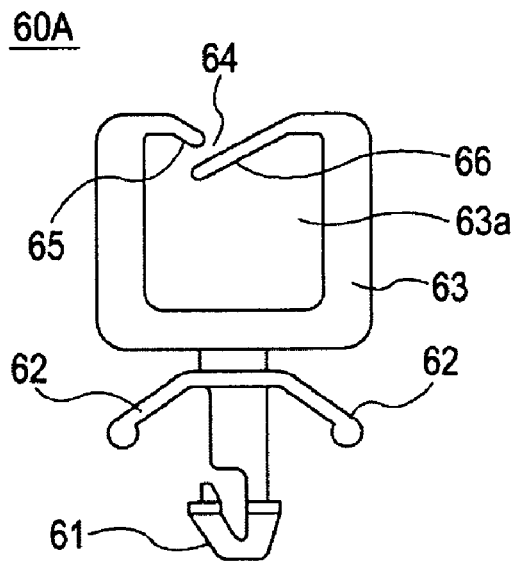
FIG. 2 is a front elevational view showing a clamp member, which is used for the conventional example 1 of the wire accommodating apparatus, in enlargement.
Figure 3:
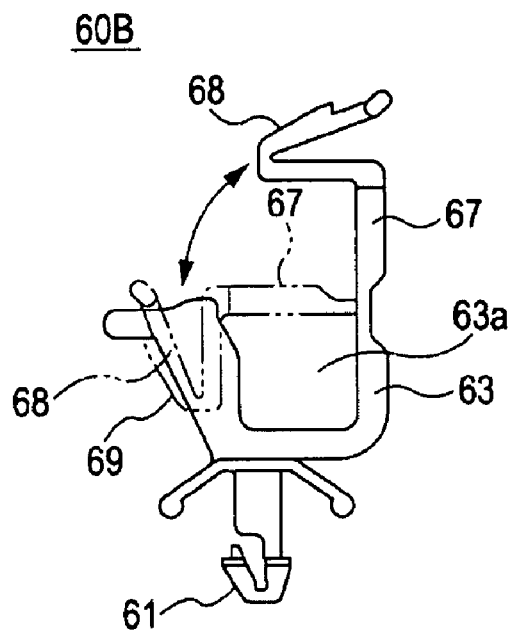
FIG. 3 is a front elevational view showing another example of the clamp member, which is used for the conventional example 1 of the wire accommodating apparatus, in enlargement.
Figure 4:
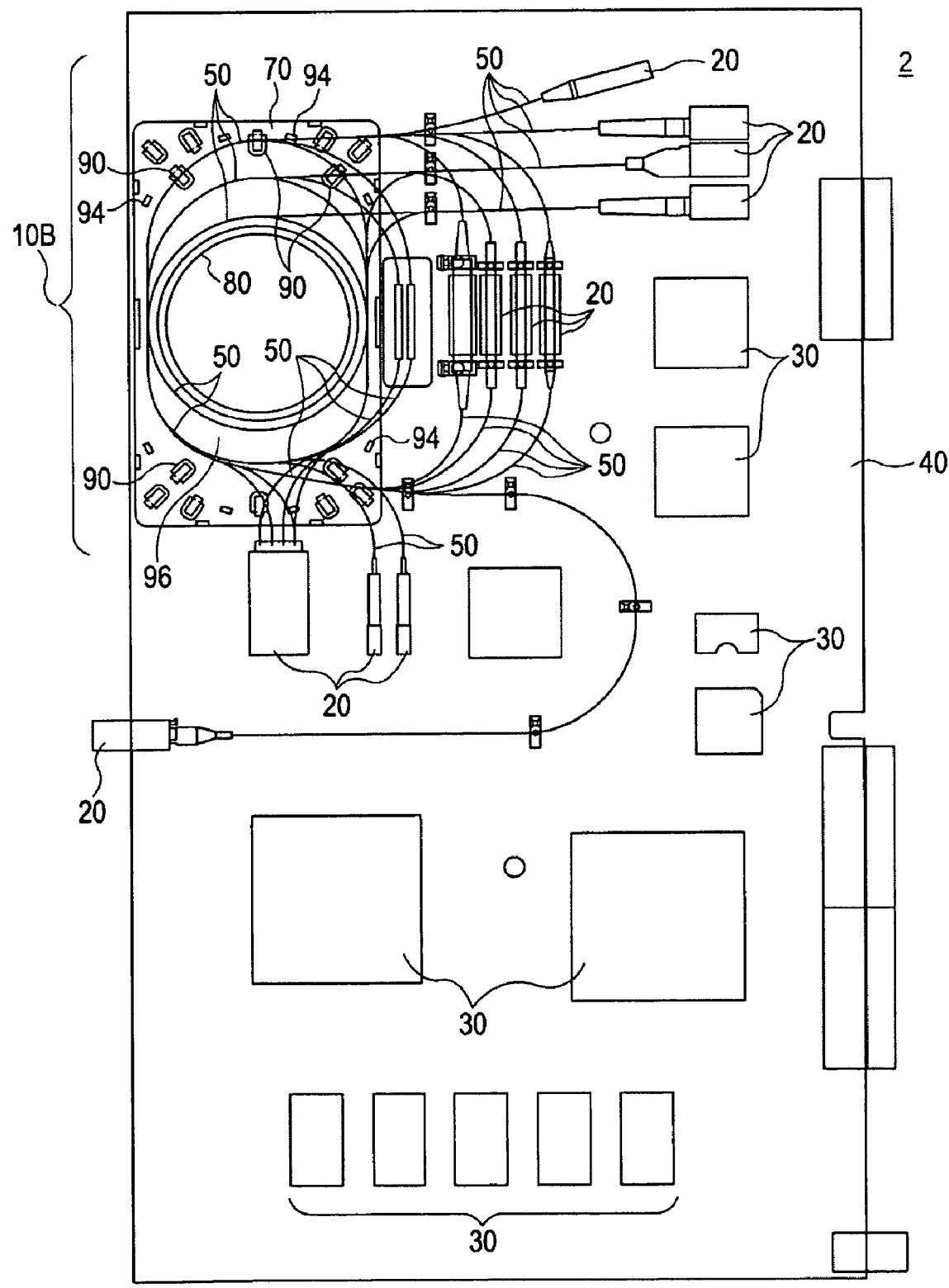
FIG. 4 is a plan view of a printed substrate on which a conventional example 2 of the wire accommodating apparatus is mounted.
Figure 5:
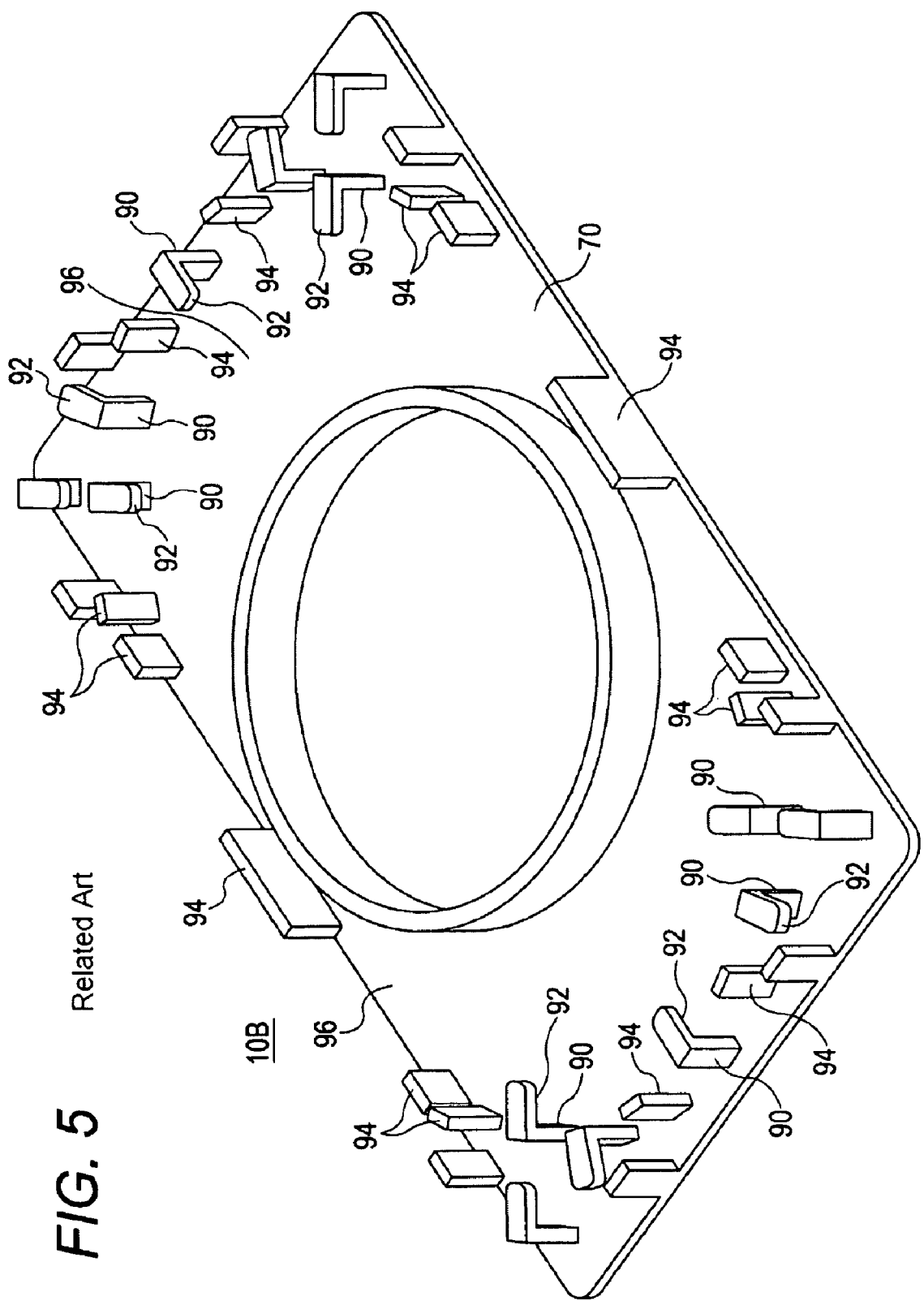
FIG. 5 is a perspective view showing the conventional example 2 of the wire accommodating apparatus in enlargement.
Figure 6:
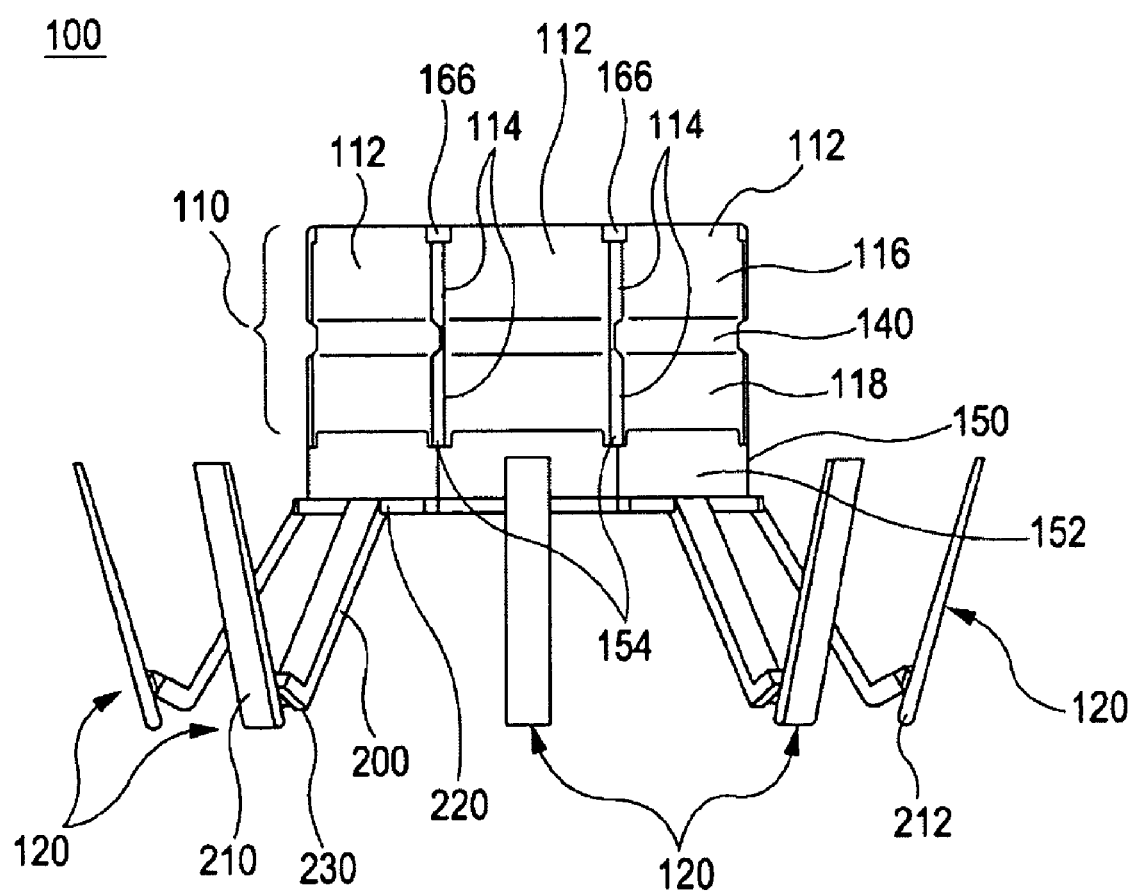
FIG. 6 is a front elevational view showing an embodiment of a wire accommodating apparatus according to the present invention.
Figure 7:
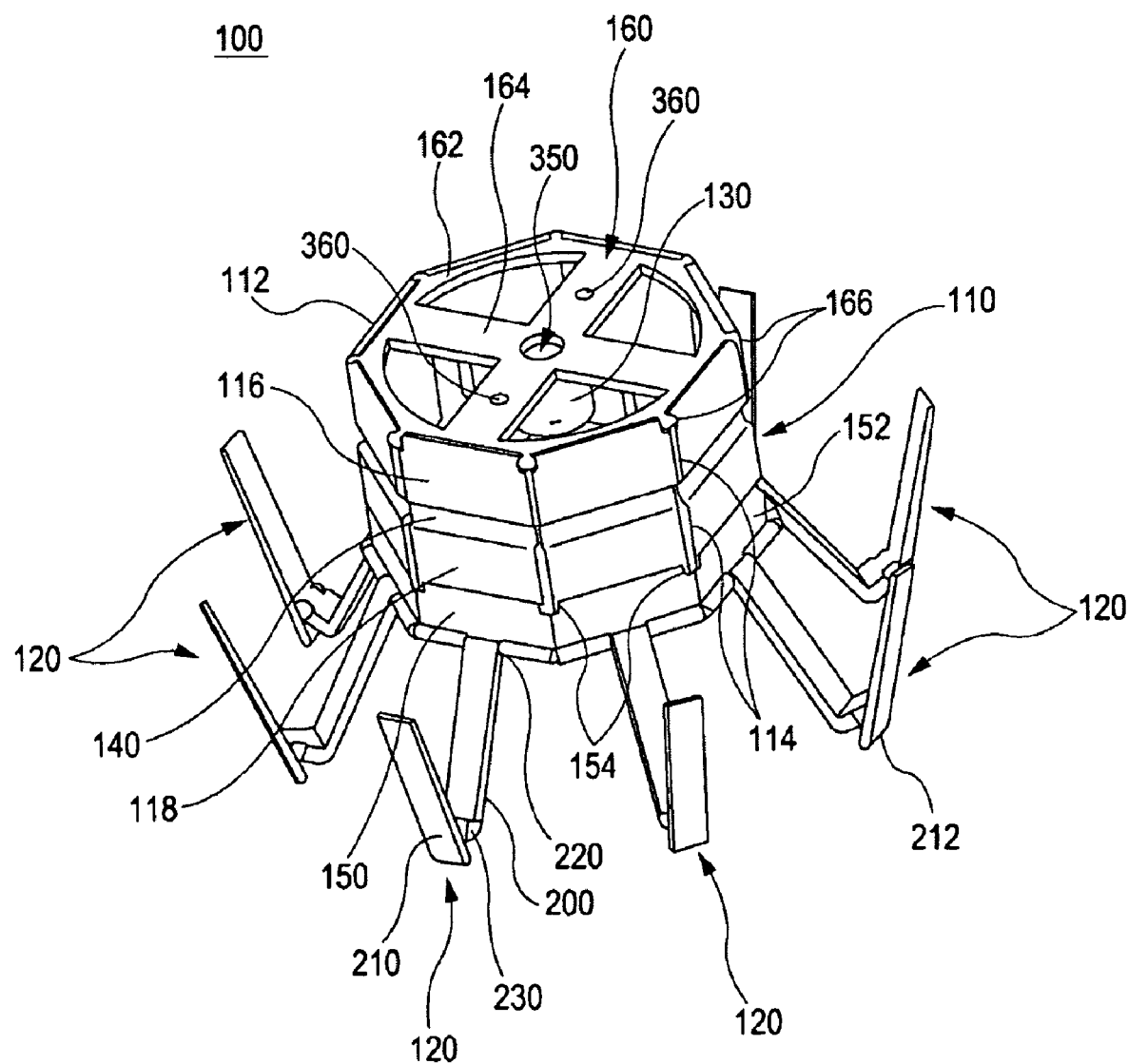
FIG. 7 is a perspective view showing the embodiment of the wire accommodating apparatus according to the present invention.

FIGS. 6 and 7 are views showing the embodiment of a wire accommodating apparatus according to the invention. As shown in FIGS. 6 and 7, the wire accommodating apparatus 100 has a cylindrical portion 110 around which wires connected to signal transmission parts are wound, a plurality of wire holding portions 120, which incline externally from the bottom of the cylindrical portion 110 as well as are disposed so as to pivot with respect to the cylindrical portion 110, and a fixed portion 130 formed on the inside of the cylindrical portion 110 so as to project downward and inserted into and fixed to an attachment hole of the to-be-mounted member.

Note that, in the explanation of the embodiment, although an optical fiber cable for transmitting an optical signal is exemplified as the wire wound around the cylindrical portion 110, the wire may also be a conductive cable for transmitting an electric signal.

The cylindrical portion 110 has a lateral cross section in a horizontal direction formed in a polygonal shape, and it is formed in an octagonal shape in the embodiment when viewed from above. Further, slits 114 are formed between the side edges of respective octagonal sides 112 so that they extend in a vertical direction (axial direction). The slits 114 permit the respective sides 112 to be radially opened while being bent individually. Note that the cylindrical portion 110 may be formed in any polygonal shape (triangle shape, square shape, pentagon shape, hexagon shape, decagon shape, or the like) other than the octagonal shape.

The respective sides 112 have upper side walls 116 and lower side walls 118, and hinges 140 are formed therebetween so that they are bent externally. The hinges 140 are formed, for example, thinner than the upper and lower side walls 116 and 118 so that they can be elastically deformed in a U-shape. The hinges 140 may be arranged to make a pivot operation through shafts coupled with shaft holes in place of making the wall thickness thereof thin.

Further, the cylindrical portion 110 has a base 150 disposed on the bottom thereof, and the outer periphery of the base 150 is formed in an octagonal shape corresponding to the respective sides 112. The base 150 has respective sides 152 formed integrally therewith and is formed in a polygonal shape having the number of the sides 152 corresponding to that of the respective sides 112 of the cylindrical portion 110. Hinges 154 are formed in the upper edges of the respective sides of the base 150 and pivotably coupled with the lower edges of the lower side walls 118.

Further, a to-be-pressed portion 160 is attached to an upper opening of the cylindrical portion 110 so that it is pressed from above when operation for accommodating wires is performed. The to-be-pressed portion 160 has an annular portion 162 having an outer periphery formed in an octagonal shape corresponding to the respective sides 112 and a cross-shaped lateral portion 164 laterally disposed inside the annular portion 162. Hinges 166 are formed on the respective sides of the outer periphery of the annular portion 162 so that they are pivotably coupled with the upper edges of the upper side walls 116.

The to-be-pressed portion 160 has an attachment hole 350 formed in the center of the cross-shaped lateral portion 164 so that a locking portion 180 of another wire accommodating apparatus (refer to FIG. 8) is inserted therein. Further, the lateral portion 164 has a pair of holes 360 formed in intermediate positions of the arm portions thereof so that a pair of bosses 190 of the wire accommodating apparatus (refer to FIG. 8) are inserted thereinto. Note that the pair of bosses 190 and the pair of holes 360 are dispersed in the respective four arm portions of the lateral portion 164 so that they are offset by 90°.

Figure 8:
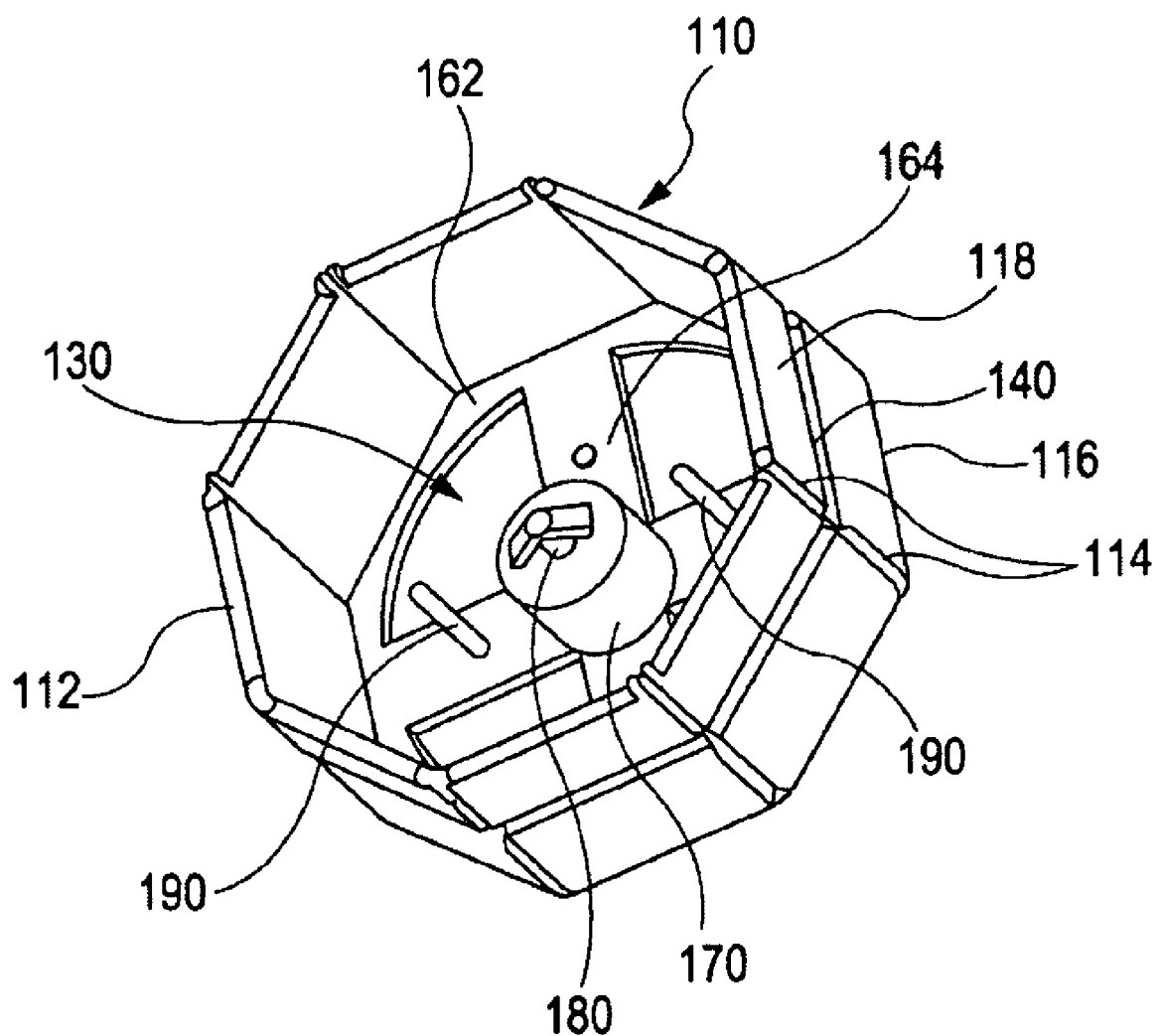
FIG. 8 is a perspective view of a cylindrical portion seen from below.

FIG. 8 is a view showing an arrangement of the fixed portion 130. As shown in FIG. 8, the fixed portion 130 is disposed on the lower surface of the lateral portion 164. Before the wires are accommodated, the fixed portion 130 is accommodated in a space formed inside the cylindrical portion 110 so that it cannot be seen from the outside. Further, the fixed portion 130 has a columnar base seat portion 170 coupled integrally with the lower surface of the lateral portion 164, an arrowhead-shaped locking portion 180 projecting downward from the lower surface of the base seat portion 170, and the pair of bosses 190 projecting downward from positions spaced apart from the outer periphery of the base seat portion 170 by a predetermined distance.

The locking portion 180 is located on the center axis of the cylindrical portion 110, and the pair of bosses 190 are formed at positions spaced apart from the center axis of the cylindrical portion 110 in the horizontal direction. Accordingly, when the wire accommodating apparatus is mounted, since the pair of bosses 190 are inserted into holes of the to-be-mounted member (a printed substrate or a metal sheet), the cylindrical portion 110 is prevented from rotating about the locking portion 180.

Further, in the cylindrical portion 110, the slits 114 are formed on both the sides of the respective sides 112, the hinges 140 are formed between the upper side walls 116 and the lower side walls 118, and the upper edges of the upper side walls 116 and the lower edges of the lower side walls 118 are pivotably supported. Accordingly, when the to-be-pressed portion 160 is pressed downward, the base 150 is pressed onto the to-be-mounted member as described later. With this operation, since the upper and lower side walls 116 and 118 receive a compression load in the vertical direction (axial direction), they can project sideward of the outer periphery of the cylindrical portion 110 while inclining so as to bend using the hinges 140 as fulcrums.

As shown FIGS. 6 and 7, the eight wire holding portions 120 are disposed at the positions corresponding to the respective sides 112 of the cylindrical portion 110 and coupled to pivot in the peripheral direction of the bottom of the base 150 at intervals of 45° so that they correspond to the respective sides 152 of the octagonal base 150. The upper edges of the wire holding portions 120 are pivotably coupled with the respective sides of the base 150 formed on the bottom of the cylindrical body 110, and the lower edges thereof have first holding members 200, which incline externally downward of the cylindrical portion 110, and second holding members 210, which are coupled with the lower edges of the first holding members 200 and the edges of which incline upward.

An arrangement of the wire holding portions 120 and a wire accommodating operation of the first and second holding members 200 and 210 will be explained referring to FIGS. 9A to 9D.

Figure 9A:
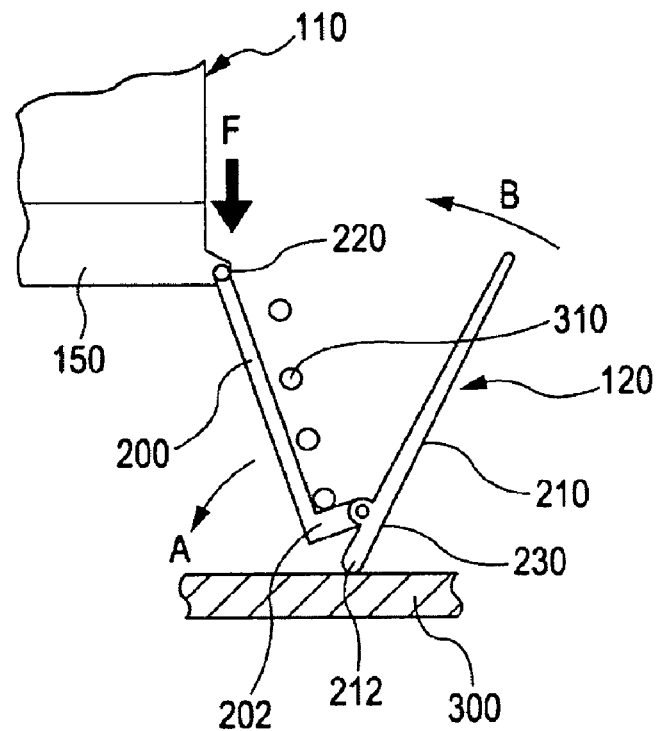
FIG. 9A is a view showing a state before wire holding portions 120 are pivoted in enlargement.

As shown in FIG. 9A, the upper edges of the first holding members 200 are coupled so as to be pivoted by hinges 220 in a direction A with respect to the outer periphery of the bottom of the base 150 of the cylindrical portion 110, and the second holding members 210 are coupled so as to be pivoted by hinges 230 in a direction B with respect to the lower edges of the first holding members 200. Before the wires are accommodated, since the first and second holding members 200 and 210 are formed in a V-shape, wires 310 wound around the outer periphery of the cylindrical portion 110 can move between the first and second holding members 200 and 210 while they are caused to fall by the action of self weight and the tension thereof.

Note that the hinges 220, 230 may make a pivot operation through shafts coupled with shaft holes or through flexible thin wall portions.

The hinges 230 are formed to be coupled with intermediate portions of the second holding members 210 in the longitudinal direction thereof in place of the lower edges of the second holding members 210. Therefore, the second holding members 210 have extending portions 212 disposed in the lower edges thereof and extending downward. The extending portions 212 act as stoppers which are abutted against the lower edges of the first holding members 200 to prevent the second holding members 210 from excessively opening externally.

Further, the extending portions 212 extend downward of the lower edges of the first holding members 200. Accordingly, in a wire accommodation operation, when the cylindrical portion 110 is pressed downward by a press force F, the extending portions 212 are abutted against the to-be-mounted member (composed of the printed substrate, metal sheet, or the like) 300 first and receive reaction force therefrom. Since the reaction force acts on the lower edges of the first holding members 200 through the hinges 230, the first holding members 200 pivot about the hinges 220 of the upper edges in the direction A. Note that, when a vertical compression load is applied, since the upper and lower side walls 116 and 118 are in a vertical state, the wire holding portions 120 in an inclining state perform a bending operation first.

Figure 9B:
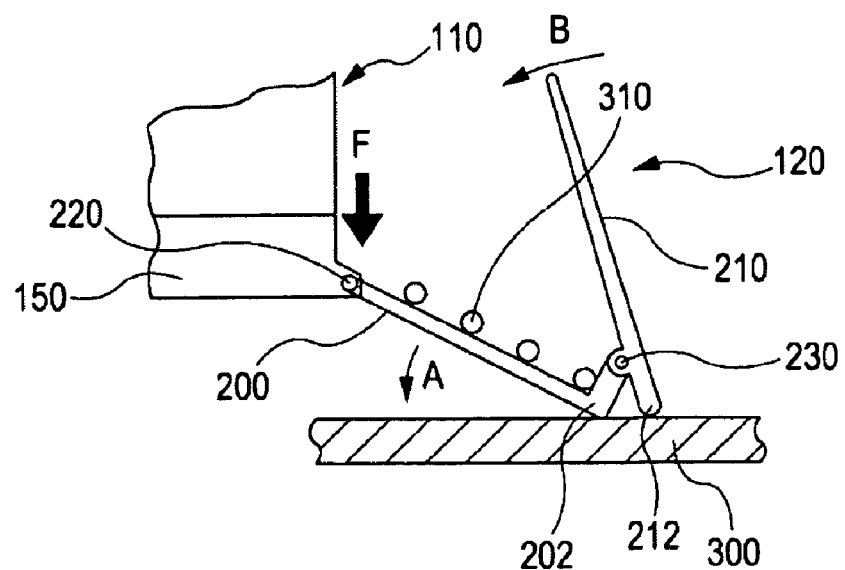
FIG. 9B is a view showing a pivot operation process 1 of the wire holding portions 120.

As shown in FIG. 9B, as the first holding members 200 are pivoted in the direction A, the second holding members 210 coupled therewith through the hinges 230 are also pivoted in the direction B. Further, since the lower edge corners 202 of the first holding members 200 are bent in an L-shape, the inclining angle of the first holding members 200 is reduced with respect to the horizontal direction as the first holding members 200 are pivoted as well as the first holding members 200 are abutted against the to-be-mounted member 300 in place of the extending portions 212.

Figure 9C:
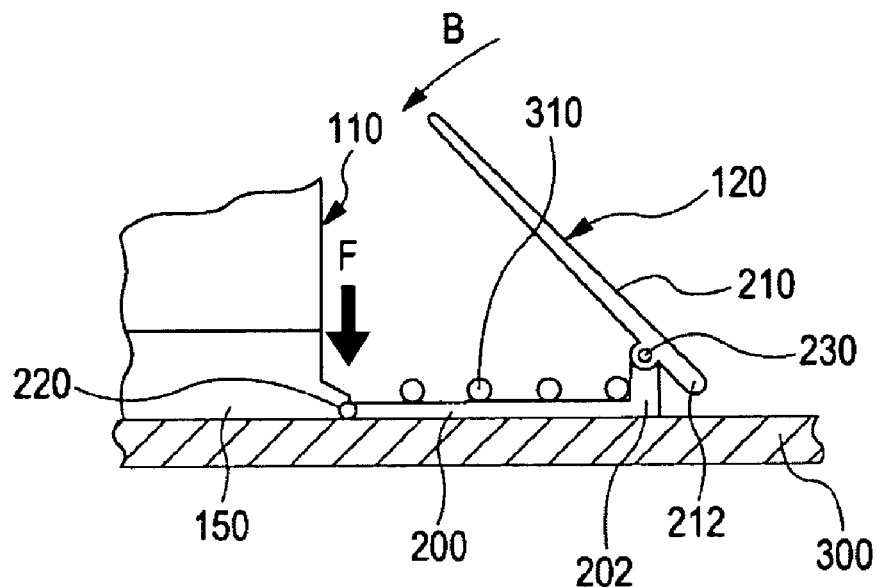
FIG. 9C is a view showing a pivot operation process 2 of the wire holding portions 120.

As shown in FIG. 9C, the first and second holding members 200 and 210 are pivoted externally of the cylindrical body 110 as well as the first holding members 200 come into contact with the upper surface of the to-be-mounted member 300.

Figure 9D:
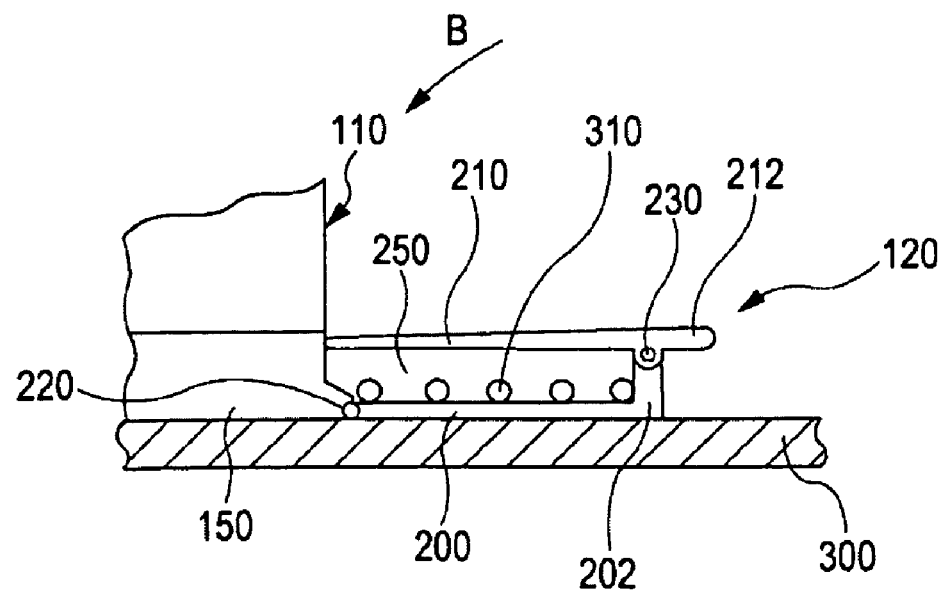
FIG. 9D is a view showing a finished state of the pivot operation of the wire holding portions 120.

As shown in FIG. 9D, although the first holding members 200 are abutted against the upper surface of the to-be-mounted member 300 and stop the pivot operation, the second holding members 210 are pivoted in the direction B by inertia using the hinges 230 as fulcrums of the pivot operation and made to a horizontal state. With this operation, a wire accommodating portion 250 that extends in a radial direction is formed between the first and second holding members 200 and 210 pivoted in a parallel state to each other. Since the wire accommodating portion 250 is formed over the entire lengths of the first and second holding members 200 and 210 (excluding the extending portions 212), it can accommodate a lot of the wires 310. As a result, the wires 310 wound around the outer periphery of the cylindrical body 110 is accommodated so as to be clamped between the first and second holding members 200 and 210 and held therebetween so that they do not protrude externally.

As described above, the first holding members 200 are coupled with the outer periphery of the bottom of the base 150 through the hinges 220 so that they can be pivoted in the direction A as well as the second holding members 210 are coupled with the lower edges of the first holding members 200 through the hinges 230 so that they can be pivoted in the direction B. As a result, when the cylindrical portion 110 is pressed against the to-be-mounted member 300, the wire holding portions 120 can smoothly accommodate and hold compactly the plurality of wires 310 wound around the outer periphery of the cylindrical portion 110 while being bent externally.

Next, an operation for accommodating wires to the wire accommodating apparatus 100 will be explained referring to FIGS. 10A to 10F. Note that the operation will be explained here as to an example for accommodating optical fibers disposed on the printed substrate.

Figure 10A:
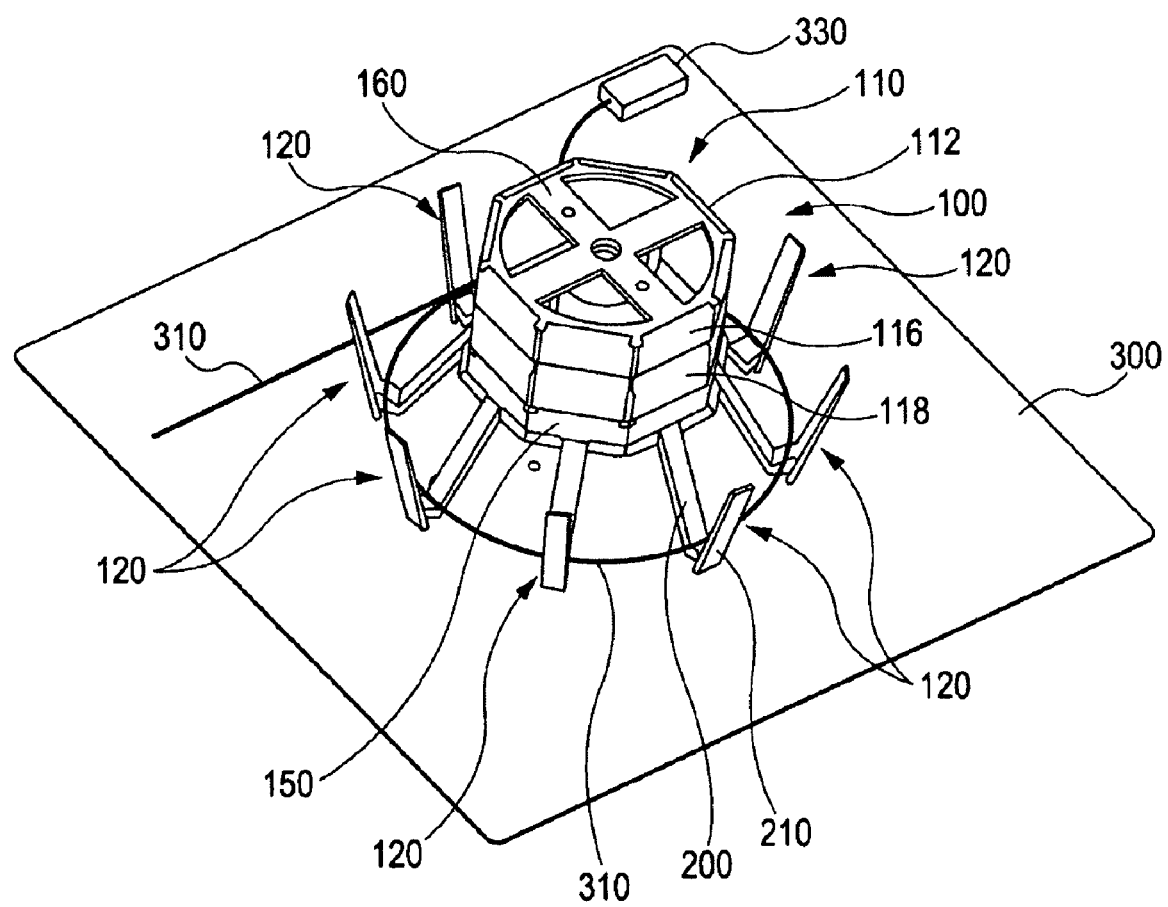
FIG. 10A is a perspective view showing a mounting operation process 1 of the wire accommodating apparatus according to the present invention.

As shown in FIG. 10A, signal transmission parts 330 composed of optical parts are mounted on the to-be-mounted member 300 composed of the printed substrate, and the wires 310 composed of the optical fibers are connected to the signal transmission parts 330. The wire accommodating apparatus 100 is placed on the to-be-mounted member 300 in a state that the wire holding portions 120 are abutted on the to-be-mounted member 300.

Next, an excessive portion of the wire 310 is wound around the outer periphery of the cylindrical portion 110 of the wire accommodating apparatus 100. Note that, although one wire 310 is wound around the outer periphery of the cylindrical portion 110 only once in FIG. 10A, actually, a plurality of the wires 310 may be wound around the outer periphery of the cylindrical portion 110 a number of times depending on the lengths of excessive portions of the wires 310.

Further, since the outer periphery of the cylindrical portion 110 is formed in a radius larger than the allowable bending radius of the optical fiber, a worker need not care about how the wires 310, which are curved in an arc-shape, are flexed when he or she winds the wires 310 around the periphery of the cylindrical portion 110.

The wires 310, which are wound around the outer periphery of the cylindrical portion 110, are offset downward by self weight and the tension thereof (restoring force for returning them to a linear state) while increasing the diameters thereof and move to the wire holding portions 120. Accordingly, the wires 310 move between the first and second holding members 200 and 210 formed in the V-shape as shown in FIG. 9A.

Figure 10B:
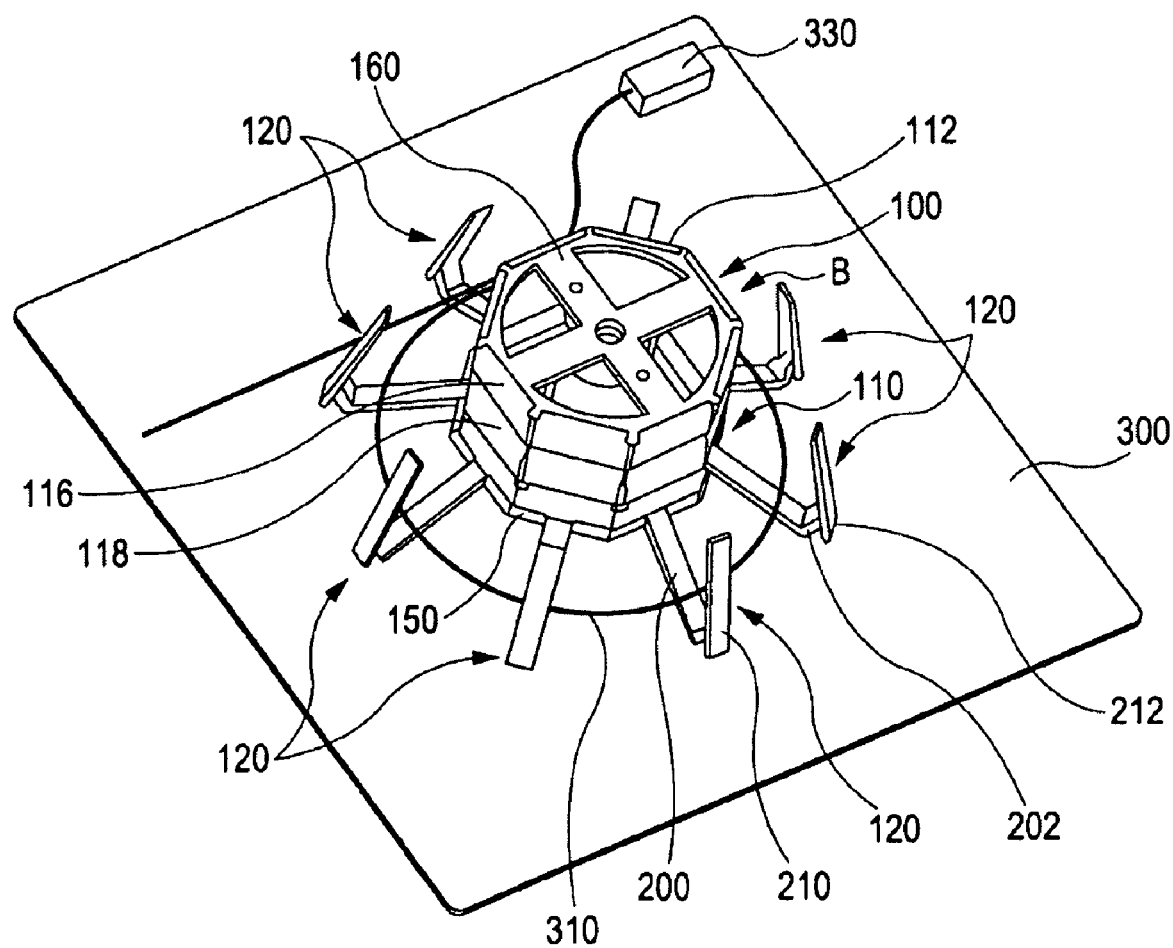
FIG. 10B is a perspective view showing a mounting operation process 2 of the wire accommodating apparatus according to the present invention.

As shown in FIG. 10B, when a winding operation of the wires 310 is finished, the to-be-pressed portion 160 at the upper end of the cylindrical portion 110 is pressed downward against the to-be-mounted member 300. With this operation, the plurality of wire holding portions 120, which are pivotably coupled with the outer periphery of the bottom of the cylindrical portion 110, are pivoted externally, respectively. At this time, the first and second holding members 200 and 210, which constitute the respective wire holding portions 120, perform the pivot operation explained in FIG. 9B described above.

Figure 10C:
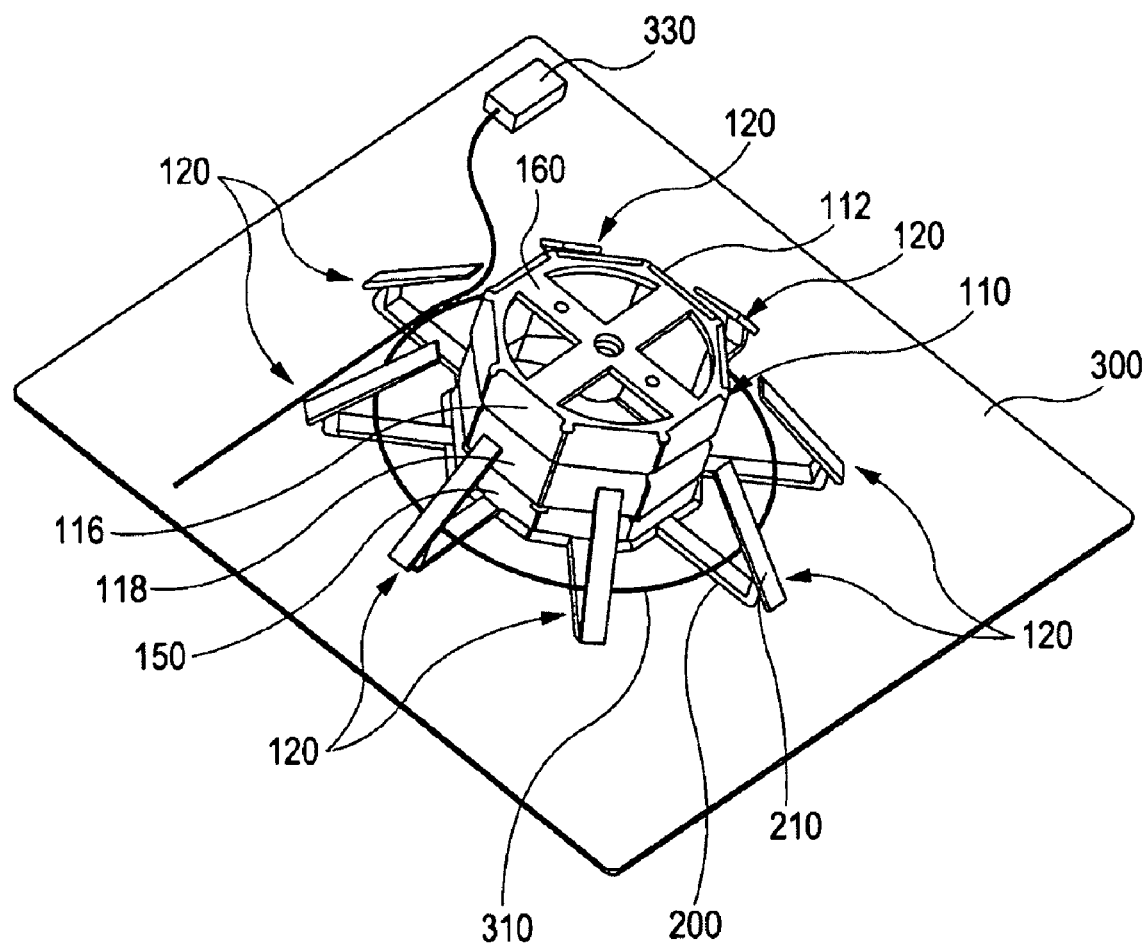
FIG. 10C is a perspective view showing a mounting operation process 3 of the wire accommodating apparatus according to the present invention.

As shown in FIG. 10C, when the to-be-pressed portion 160 of the cylindrical portion 110 is further pressed downward against the to-be-mounted member 300, the first holding members 200 are made to the horizontal state and abutted against the upper surface of the to-be-mounted member 300. At this time, in the respective wire holding portions 120, the first and second holding members 200 and 210 perform the pivot operation explained in FIG. 9C described above.

Figure 10D:
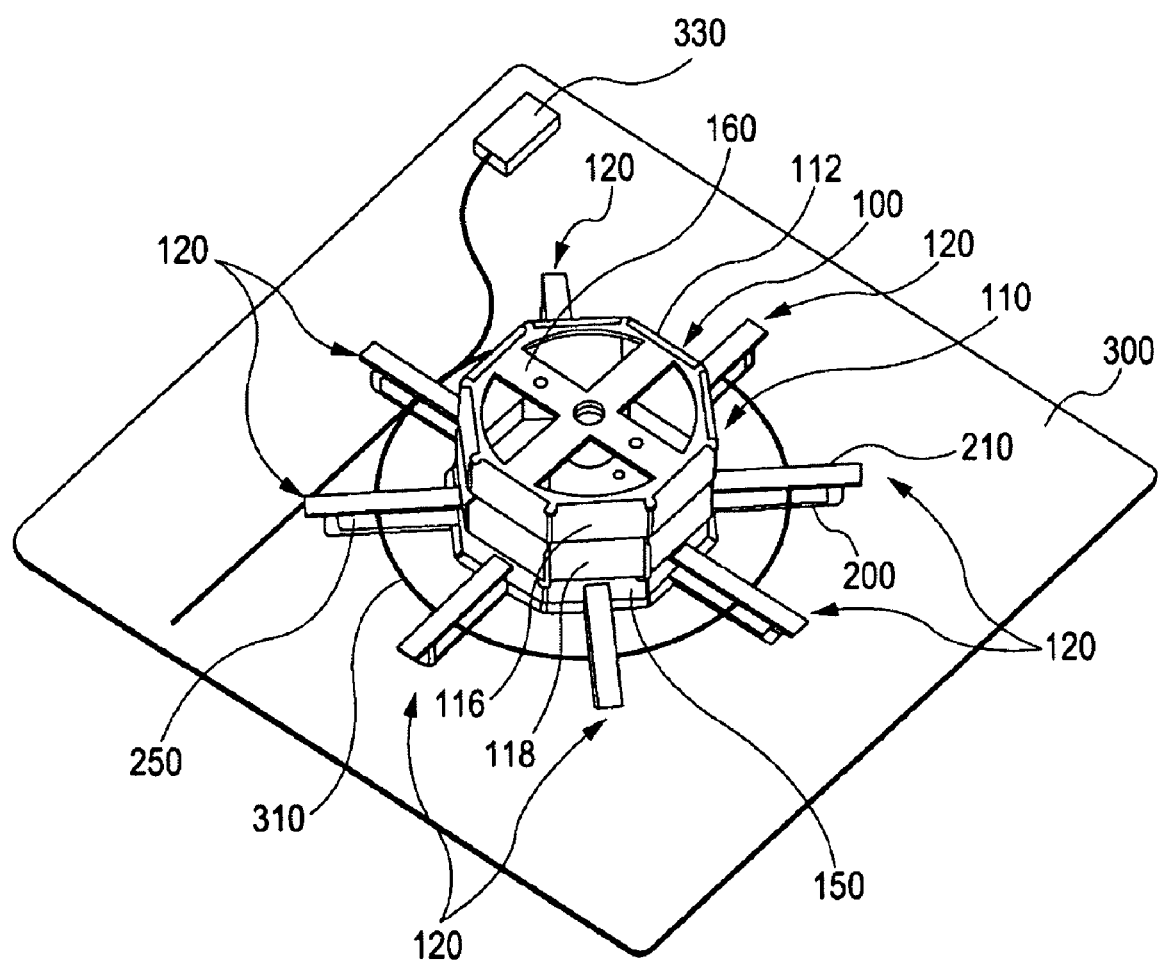
FIG. 10D is a perspective view showing a mounting operation process 4 of the wire accommodating apparatus according to the present invention.

As shown in FIG. 10D, the first and second holding members 200 and 210 are made to a parallel state in which they extend in the horizontal direction each other, and the wire accommodating portion 250 that extends in the radial direction is formed between the first and second holding members 200 and 210. Since the wire accommodating portion 250 is a slender space formed in the radial direction, a lot of the wires 310 can be accommodated. Moreover, since the wire accommodating portion 250 is a closed space surrounded by the base 150 and the first and second holding members 200 and 210, the wires 310 do not protrude externally. A first stage of the wire accommodating operation performed by the wire accommodating apparatus 100 is completed as described above.

Figure 10E:
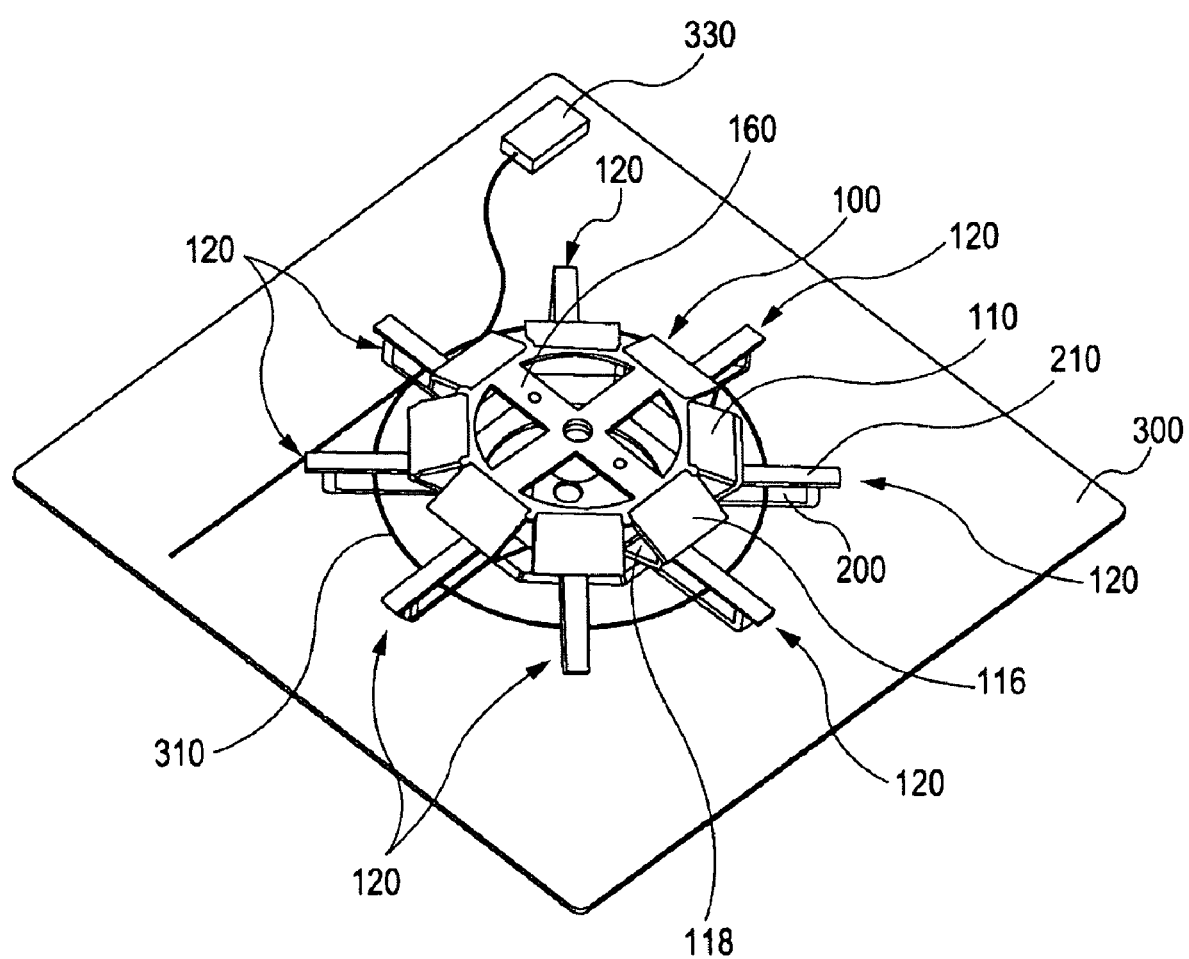
FIG. 10E is a perspective view showing a mounting operation process 5 of the wire accommodating apparatus according to the present invention.

As shown in FIG. 10E, when the to-be-pressed portion 160 of the cylindrical portion 110 is further pressed downward against the to-be-mounted member 300, since the respective wire holding portions 120 have finished the bending operation, the compression load acts on the upper and lower side walls 116 and 118 of the respective sides 112 of the cylindrical portion 110.

Since the hinges 140 (refer to FIGS. 6 and 7) are disposed in the intermediate portions of the upper and lower side walls 116 and 118, the upper edges of the upper side walls 116 are pivotably coupled with the respective sides of the outer periphery of the to-be-pressed portion 160 through the hinges 166, and the lower edges of the lower side walls 118 are pivotably coupled with the upper edges of the respective sides of the base 150 through the hinges 154, the upper and lower side walls 116 and 118 can perform the pivot operation so that they are smoothly bent externally.

Further, since the respective sides 112 that form the outer periphery of the cylindrical portion 110 are separated from each other by the slits 114 (refer to FIGS. 6 and 7), the upper and lower side walls 116 and 118, which receive the compression load in the vertical direction, project like eaves while bending externally of the cylindrical portion 110. With this operation, the upper and lower side walls 116 and 118 which project externally of the respective sides 112 are abutted against the second holding members 210 that form the wire accommodating portion 250 and regulate the second holding members 210 from pivoting upward. As a result, the wire accommodating portion 250 is held in a closed state.

Figure 10F:
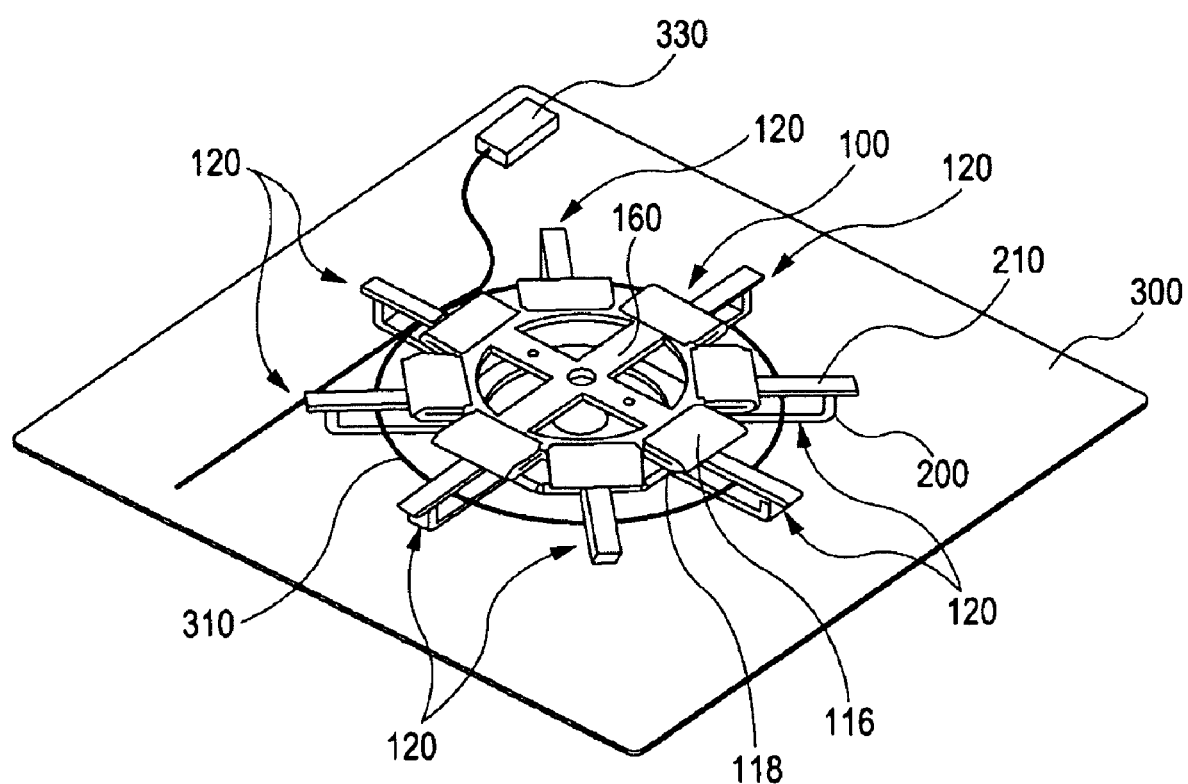
FIG. 10F is a perspective view showing a mounting operation process 6 of the wire accommodating apparatus according to the present invention.
Figure 11A:
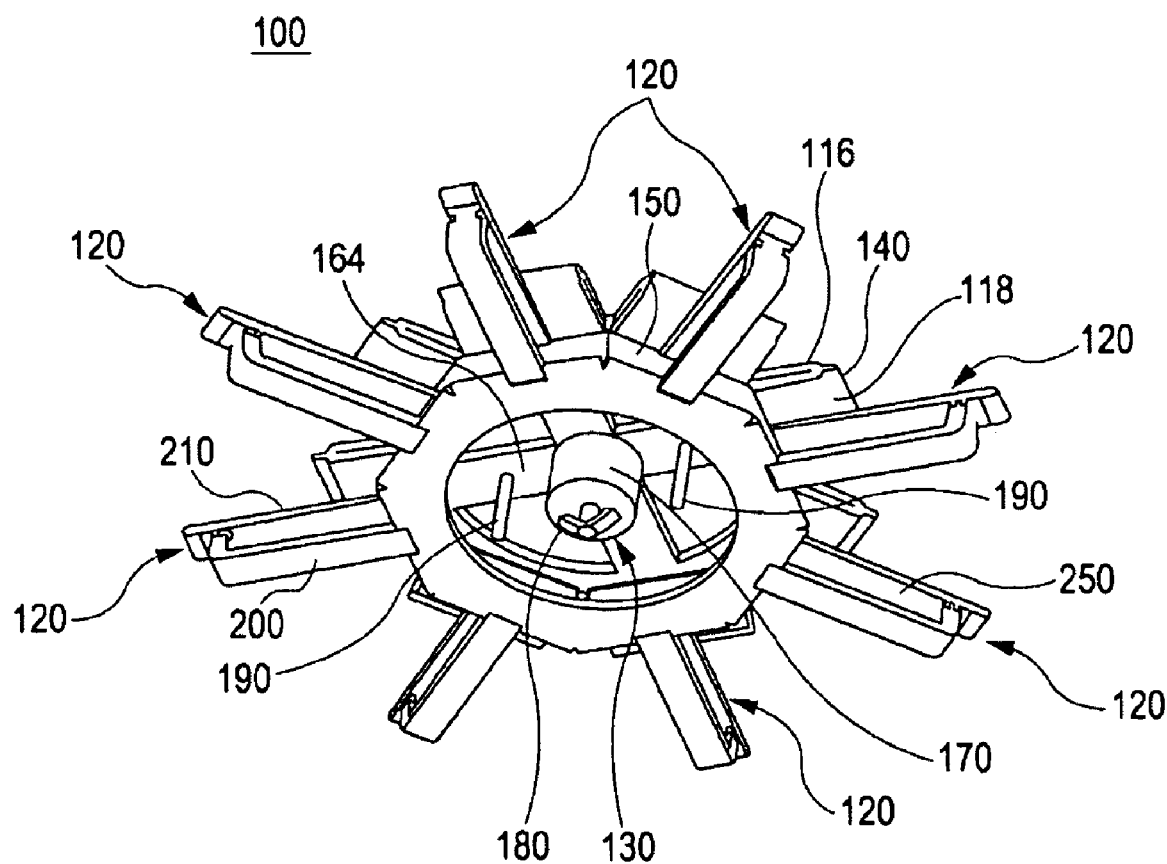
FIG. 11A is a perspective view of a mounting finished state of the wire accommodating apparatus seen from below.
Figure 11B:
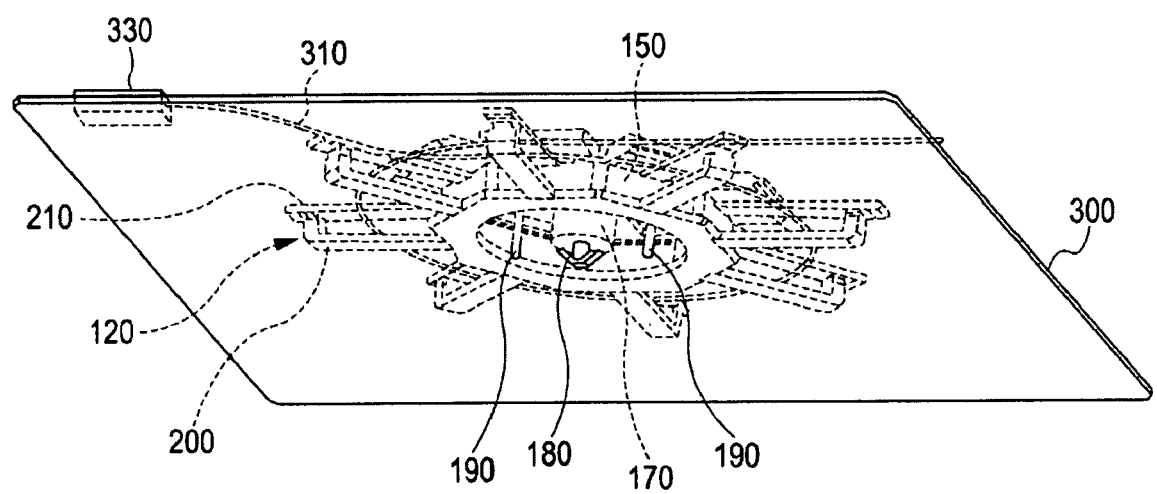
FIG. 11B is a perspective view of a state that the wire accommodating apparatus is mounted on a to-be-mounted member when it is seen from below.
Figure 11C:
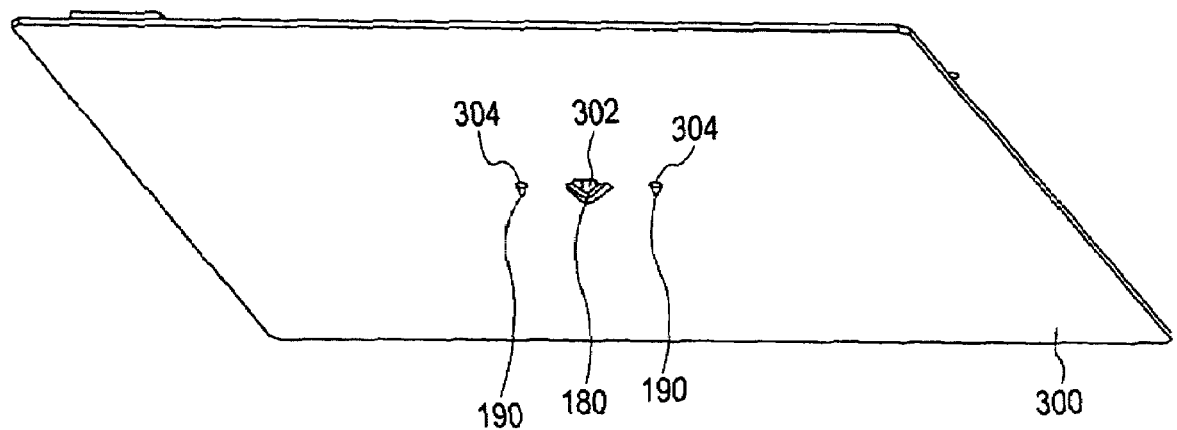
FIG. 11C is a perspective view of a locking portion and an inserted state of bosses when the wire accommodating apparatus is mounted on the to-be-mounted member when it is seen from below.
Figure 12:
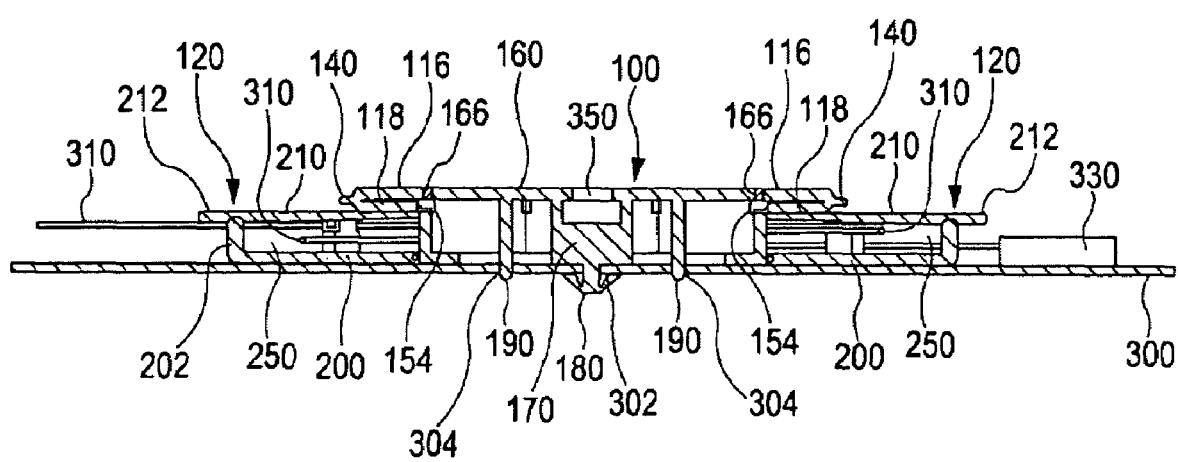
FIG. 12 is a longitudinal sectional view showing a state that the wire accommodating apparatus is mounted on a to-be-mounted member.

As shown in FIG. 10F, when the to-be-pressed portion 160 of the cylindrical portion 110 is further pressed downward against the to-be-mounted member 300, the upper and lower side walls 116 and 118 are bent in the horizontal direction. As shown in FIGS. 11A to 11C and 12, the locking portion 180 of the fixed portion 130, which projects downward from the lower surface of the to-be-pressed portion 160, is inserted into an attachment hole 302 of the to-be-mounted member 300 and locked to the back surface of the to-be-mounted member 300. Simultaneously with the above operation, the pair of bosses 190 projecting downward from the lower surface of the to-be-pressed portion 160 are inserted into holes 304 of the to-be-mounted member 300 to thereby prevent the wire accommodating apparatus 100 from rotating about the locking portion 180.

As described above, since the locking portion 180 passes through the attachment hole 302 of the to-be-mounted member 300 and locked therein, the wire accommodating apparatus 100 is fixed to the to-be-mounted member 300. Simultaneously with the above operation, since the locking portion 180 is locked to the attachment hole 302 of the to-be-mounted member 300 in a state that the base seat portion 170 formed in the lower portion of the to-be-pressed portion 160 is abutted against the to-be-mounted member 300, it is regulated that the to-be-pressed portion 160 is offset upward. As a result, since the to-be-pressed portion 160 keeps the bent upper and lower side walls 116 and 118 in a pressed state, it can keep the respective wire holding portions 120 in a bent state through the upper and lower side walls 116 and 118. Since the wires 310, which are held by the wire accommodating portion 250, are prevented from being released therefrom, the reliability of a wire holding structure realized by the wire accommodating apparatus 100 can be enhanced.

Since a mounting operation to the wire accommodating apparatus 100 shown in FIGS. 10A to 10F can be continuously executed, the worker can efficiently perform a mounting operation in a short time because he or she can accommodate and hold the plurality of wires 310 in the wire accommodating portion 250 by only pressing downward on the to-be-pressed portion 160.

Further, in the wire accommodating apparatus 100, since the radius of curvature of the outer periphery of the cylindrical portion 110 is minimized with respect to the allowable bending radius of the wires 310, the wire accommodating apparatus 100 is arranged compact by reducing a space in which the wires 310 are accommodated. Accordingly, the wire accommodating apparatus 100 can be also mounted on a printed substrate on which a lot of parts are mounted highly densely.

Further, since the wires 310 accommodated in the wire accommodating portion 250 can be drawn out from between the plurality of wire holding portions 120 that open radially when viewed from above, the directions in which the wires 310 are drawn out can be appropriately selected according to the relative position (direction) of the signal transmission parts 330 disposed around the wire holding portions 120.

A modification of the wire accommodating apparatus will be explained referring to FIGS. 13 and 14.

Figure 13:
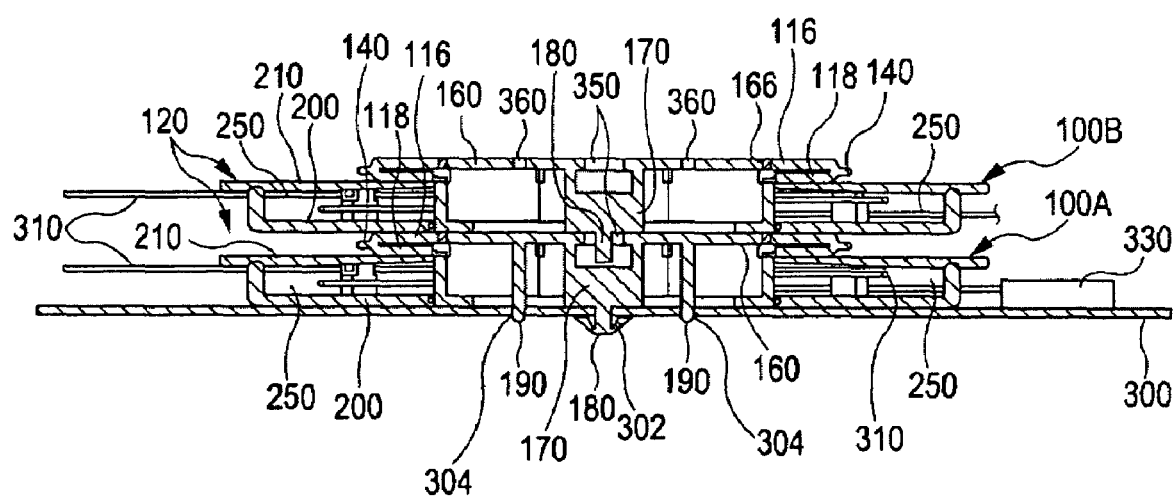
FIG. 13 is a longitudinal sectional view showing a modification of the wire accommodating apparatus.
Figure 14:
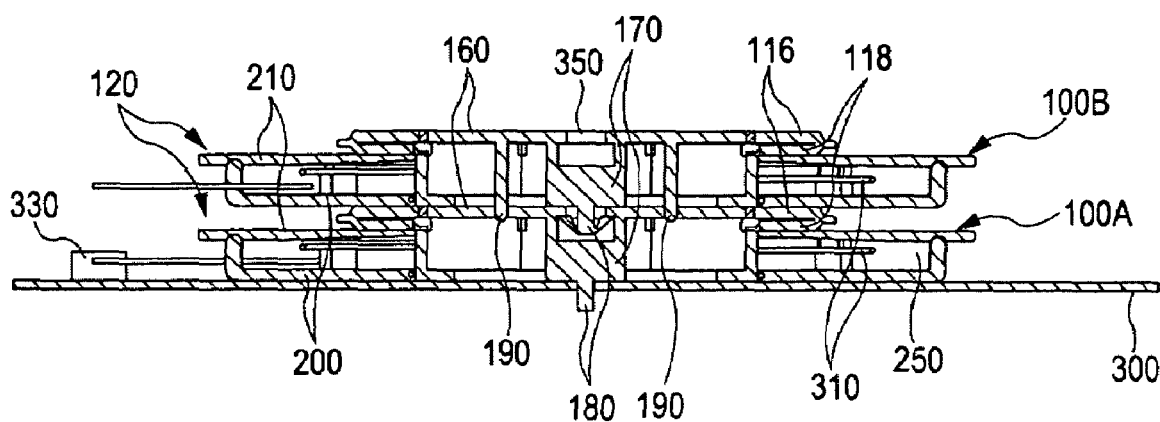
FIG. 14 is a longitudinal sectional view showing the modification of the wire accommodating apparatus when it is seen from another direction.

As shown in FIGS. 13 and 14, an attachment hole 350 into which a locking portion 180 is inserted and a pair of holes 360 into which a pair of bosses 190 are inserted are formed on the upper surface of a to-be-pressed portion 160. Note that a first stage wire accommodating apparatus 100A is fixed on the upper surface of a to-be-mounted member 300 as described above. Then, a locking portion 180 of a second stage wire accommodating apparatus 100B is inserted into the attachment hole 350 formed in the to-be-pressed portion 160 of the wire accommodating apparatus 100A, and a pair of bosses 190 of the second stage wire accommodating apparatus 100B are inserted into the pair of holes 360 formed in the to-be-pressed portion 160 of the wire accommodating apparatus 100A. With this arrangement, the second stage wire accommodating apparatus 100B can be mounted on the first stage wire accommodating apparatus 100A.

Further, although FIGS. 13 and 14 show an arrangement in which the wire accommodating apparatuses 100A and 100B are stacked, other wire accommodating apparatuses 100 of third, fourth, . . . stages can also be stacked three-dimensionally.

As described above, when there are a lot of wires 310 to be accommodated, they can be effectively accommodated using a plurality of the wire accommodating apparatuses 100, and the plurality of the wire accommodating apparatuses 100 can be mounted without expanding a limited attachment space of the to-be-mounted member 300.

Although the embodiment of the present invention has been described above in detail, the present invention is not limited to the specific embodiments and can be variously modified and changed within the gist of the present invention according to the claims.

What is claimed is:

1. A wire accommodating apparatus comprising:
a cylindrical portion around which a wire connected to a signal transmission part is wound;
a plurality of wire holding portions which incline externally from the bottom of the cylindrical portion as well as are disposed pivotably; and
a fixed portion formed in the cylindrical portion so as to project downward, passing through an attachment hole of a to-be-mounted member and fixing therein,
wherein the wire holding portions are formed to be free to bend, and when the cylindrical portion is pressed on the to-be-mounted member, the wire holding portions come into contact with the to-be-mounted member, pivot, as well as bend so that the wire wound around the outer periphery of the cylindrical body is clamped by the bent wire holding portions and held thereby.

2. The wire accommodating apparatus according to claim 1,
wherein each of the plurality of wire holding portions comprises:
a first holding member having one end pivotably coupled with the bottom of the cylindrical body and the other end inclining externally downward of the cylindrical portion; and
a second holding member pivotably coupled with the other end of the first holding member and having an end inclining upward.

3. The wire accommodating apparatus according to claim 2,
wherein the first and second holding members pivot and offset to positions where they extend in radial directions and are made parallel with each other in a process of pressing the cylindrical portion onto the to-be-mounted member to form a wire accommodating portion.

4. The wire accommodating apparatus according to claim 3,
wherein the cylindrical portion comprises a to-be-pressed portion formed in the upper end thereof so that it receives a press force, and
a bent portion is deformed so as to project externally in the radial direction when the to-be-pressed portion is pressed.

5. The wire accommodating apparatus according to claim 4,
wherein the fixed portion comprises a locking portion formed on the lower surface of the to-be-pressed portion and inserted into an attachment hole of the to-be-mounted member and a pair of bosses inserted into a pair of holes of the to-be-mounted member.

6. The wire accommodating apparatus according to claim 4,
wherein the to-be-pressed portion of the cylindrical portion comprises: an attachment hole into which a fixed portion disposed in other wire accommodating apparatus is inserted; and
inserting holes into which rotation prevention bosses formed in the other wire accommodating apparatus are inserted.

7. The wire accommodating apparatus according to claim 3,
wherein the cylindrical portion is formed in a polygonal shape in a horizontal lateral cross section, and
upper and lower side walls are attached to the respective polygonal sides of the cylindrical portion so that they can be bent, the wire holding portions are bent by that the cylindrical portion is pressed, and subsequently the upper and lower side walls are bent optionally.

8. The wire accommodating apparatus according to claim 2,
wherein the second holding members have extending portions extending downward from the coupling portions with the first holding members.

9. The wire accommodating apparatus according to claim 2,
wherein an intermediate portion in an axial direction of the cylindrical portion is formed such that it is free to bend in a radial direction, and when a compression load is applied to the cylindrical portion in the axial direction, a bent portion thereof projects externally in the radial direction and presses the second holding members in the directions where they are made parallel with the first holding members.

10. The wire accommodating apparatus according to claim 1,
wherein the fixed portion comprises a locking portion which is formed in an arrowhead shape, inserted into an attachment hole of a substrate on which the signal transmission part is mounted, and locked to the back surface of the substrate.

11. The wire accommodating apparatus according to the claim 10,
wherein the cylindrical portion comprises rotation preventing bosses formed therein and inserted into insertion holes formed in the vicinity of the attachment hole.

12. The wire accommodating apparatus according to claim 1,
wherein the wire comprises an optical fiber, and
the outer periphery of the cylindrical portion is formed to a radius larger than a minimum radius of curvature of the wire by which the optical fiber is not broken.

13. The wire accommodating apparatus according to claim 1,
wherein the cylindrical portion is formed in a polygonal shape, and
the wire holding portions are formed on the respective sides of the polygonal cylindrical portion so that they are free to bend.

* * * * *